United States Patent

[11] 3,615,780

[72] Inventors Young J. Kim
Lake Hiawatha;
Charles F. Murphy, Morristown; Reid L. Mitchell, Morristown, all of N.J.
[21] Appl. No. 828,698
[22] Filed May 28, 1969
[45] Patented Oct. 26, 1971
[73] Assignee ITT Rayonier Incorporated
Shelton, Wash.

[54] SILICATE-CATALYZED CHEMICAL GROUTING COMPOSITIONS
8 Claims, No Drawings

[52] U.S. Cl. ............................................. 106/74,
106/76, 106/80, 106/83, 106/84
[51] Int. Cl. .......................................... C04b19/02,
C04b 19/04
[50] Field of Search ................................ 260/29.3,
473.5, 473.6; 106/74, 76, 80, 83, 38, 35, 232-235

[56] References Cited
UNITED STATES PATENTS
2,782,241  2/1957  Gray et al. ..................... 260/473.6
3,223,163  12/1965  Koch et al. ..................... 106/83
3,391,542  7/1968  Herrick et al. ................. 260/29.3

*Primary Examiner*—James E. Poer
*Attorneys*—C. Cornell Remsen, Jr., Paul W. Heminger, Delbert P. Warner, Walter J. Baum, Charles L. Johnson, Jr. and Marvin M. Chaban

ABSTRACT: A unique chemical grouting composition is provided for injection stabilization of earth, sand and other porous, particulate formations or agglomerates or solids. The composition produces grouted structures of excellent strength and durability and has a wide range of uses in a system comprising sequential formulation and subsequent injection of on-site-formed aqueous solutions of (a) base materials comprising vegetative polyphenolic material derived from coniferous bark or a tannin of the catechin or condensed type and of (b) catalyst mixtures comprising a water soluble alkali metal silicate, formaldehyde or paraformaldehyde, and sufficient acid to establish the catalyst solution pH at 0.5 to 6.0 and preferably 3-5. Optional modification materials such as asphalt, clay, or a hydraulic cement, or fibrous material such as asbestos, may be included.

3,615,780

SILICATE-CATALYZED CHEMICAL GROUTING COMPOSITIONS

BACKGROUND OF THE INVENTION

Chemical-grouting compositions described in U.S. Pat. No. 3,391,542 are composed of aqueous solutions of vegetative polyphenolic material derived from coniferous tree barks or tannins of the catechin or condensed type, which solutions are mixed with formaldehyde and a chromium, iron or aluminum metal ion catalyst or setting agent (which controls the time at which gelling subsequently takes place) and then injected into a solid particulate material such as earth or sand in order to form a strong gel therein and thereby produce a strong, rigid and durable grouted structure. These compositions have enjoyed commercial acceptance in the building and construction industries as valuable aids for stabilizing or consolidating earth or sand formations, stopping substantial flow of underground water, sealing foundation walls, increasing load bearing characteristics permitting tunneling operations, etc. However, the compositions are not entirely free from disadvantages or drawbacks. For example, careless handling of chromium catalyst salt solutions can result in toxicity hazards. Ferrous salt catalysts, while nontoxic, tend to cause premature or localized gelling in the grouting compositions manifested by formation of gelatinous lumps or graininess which make it difficult to inject the composition into finely porous formations.

SUMMARY OF THE INVENTION

The present invention overcomes the foregoing difficulties and is based upon the unexpected discovery that aqueous solutions of vegetative polyphenolic material derived from coniferous tree bark or of tannins of the catechin or condensed type can be gelled in very stable form by water soluble alkali metal silicates, preferably sodium or potassium silicate. When the gelling reaction is properly carried out in the presence of formaldehyde at controlled acid pH, the product is a tough, rigid, durable, irreversible aqueous gel which is highly effective in grouting applications of the kind described hereinabove. The mechanism by which these results are achieved is not fully understood, but the fact that the systems of the invention are operable in the absence of transition metal ion catalysts such as disclosed in the earlier-noted patent is contrary to our expectations, most surprising and encouraging.

DETAILED DESCRIPTION

Grouting compositions made in accordance with the invention are completely safe to operating personnel and to surrounding environment since the potassium or sodium silicate catalysts are nontoxic.

Since paraformaldehyde readily dissolves in alkaline potassium or sodium silicate solutions and remains dissolved even after adjustment of the solution pH to the acid side, grouting compositions can be prepared in accordance with the invention from all-solid ingredients dissolved in water on the jobsite. Hence, shipping, storage and handling of formaldehyde solutions can be eliminated, and instead the necessary active ingredients can be prepackaged in premeasured quantities as a multicomponent package of all dry, solid particulate components for more convenient and economical transportation and handling.

Another important benefit attributable to the unique setting catalyst is the fact that completely mixed grouting compositions containing silicate catalyst in accordance with the invention have a lower initial viscosity which allows more thorough penetration before gelling than many of the prior art compositions based on the metal ion catalysts. For example, in one comparison where the only difference was use of a sodium dichromate catalyst as compared to a sodium metasilicate catalyst, the composition containing the silicate catalyst had a viscosity one minute after mixing which was 92 percent less than that of the dichromate-containing composition. THese factors allow the grouting compositions of the invention to be more readily injected and dispersed into earth or sand formations, especially of fine pore size and large volume.

We have also observed that earth structures which have been grouted with the compositions of the invention, on drying out, have less tendency to fracture and crumble, and this is particularly valuable in grouting uses where the grouted structure is exposed to alternating periods of wetness and dryness and of freeze/thaw.

Also, the fact that the grouting compositions of the invention contain silicate catalysts which are available in abundant commercial supply and at relatively low cost makes the compositions more economical to produce and sell.

In order to form grouting compositions of the invention which have the widest range of uses, it is desirable to dissolve in aqueous solution (1) tannins of the catechin or condensed type, such as vegetative polyphenolic material derived from coniferous tree bark or from quebracho, or of mimosa, (2) sodium or potassium silicate, (3) formaldehyde or paraformaldehyde, and (4) sufficient strong acid to establish the catalyst solution pH at a range of 0.5 to 6.0 More specifically, the complete solution formed in accordance with the invention for injection into a solid particulate porous formation which is to be grouted should contain from about 5 percent to about 40 percent of the vegetative polyphenolic material based on the weight of the solution, from about 0.5 to about 5 percent of formaldehyde based on the weight of the polyphenolic material, an amount of potassium or sodium silicate which provides from about 1.0 percent to about 15 percent $SiO_2$ in the soluble silicate compound based on the weight of the polyphenolic material, and a sufficient amount of a strong acid such as sulfamic acid or sulfuric acid to establish the pH of the catalyst solution within the range from about 0.5 to about 6.0, preferably from 3.0–5.0. The sodium or potassium silicate should have a weight ratio of $SiO_2$ to $M_2O$ of from about 1.0 to about 3.8 ($M_2O$ indicating the respective metal oxide present in the silicate compound).

The complete solution should be sequentially mixed on the jobsite just before it is injected into the formation that is to be grouted. This may be done by preparing (1) a solution of the vegetative polyphenolic material and (2) a separate solution of the formaldehyde, silicate and acid ingredients, preferably by first dissolving the silicate in water, then adding the correct amount of formaldehyde or paraformaldehyde and lastly adding this solution to the acid ingredient(s). In the subsequent injection process, the two solutions are thoroughly mixed in commercial blending and injecting equipment available for grouting operations. The gel time after mixing can be readily controlled by metering the proportion of catalyst solution relative to the amount of polyphenolic material fed to the injection (and mixing) lance.

Compositions containing properly metered proportions of the above-described ingredients will produce though, rigid and durable irreversible gels for substantially permanent grouting of an earth, sand or other porous formation. Thus, these compositions will have the widest utility in a broad variety of specific applications, including foundation work, dam sealing, tunneling, sewage sealing, etc. If desired, the compositions may be fortified or modified with additional materials which may be aqueous asphalt emulsion, a bentonite clay, a hydraulic cement activated with water such as Portland cement or gypsum plaster, or asbestos. When such auxiliary materials are used, the mount thereof may vary over a wide range and a suitable amount for the desired modification may be selected and used as will be apparent to those skilled in the art.

It is also a fact that the aqueous solution of the vegetative polyphenolic material may be gelled with the sodium or potassium silicate catalysts in the absence of formaldehyde and/or acid pH. Such gels are of a more temporary character as they tend grouting slowly disperse in water. However, there are certain special grouting requirements which can be fulfilled by these less durable gels and, therefore, grouting compositions based only an the combinations of polyphenolic material and the silicate catalyst can be used in such applications. For example, in some earth excavating operations, it is sometimes desired to temporarily consolidate or shore-up the earth formation just before it is to be excavated. Here there is no need for permanent grouting, since the earth formation will be completely excavated and only a temporary stabilization is required. In such applications, the simpler compositions based only upon the vegetative polyphenolic material and silicate catalyst will be of utility.

As previously mentioned, the grouting compositions of the inventions can be prepared with all of the active ingredients in dry form and convenient transportation and storage on the jobsite in premeasured, multicomponent packages used simply by dissolving sequentially the contents in water in accordance with prescribed instructions. In order to formulate such compositions, it is necessary to use paraformaldehyde as a solid source of formaldehyde and sulfamic acid or other acid salt crystals as a solid source to strong acid required to adjust the pH of the catalyst solution within the range of 0.5 to 6.0. The vegetative polyphenolic material and, of course, the potassium or sodium silicates are dry, solid ingredients. All of these ingredients may be housed separately in the single multicomponent package in predetermined amounts which when dissolved in predetermined quantities of water will provide an aqueous chemical grouting solution having useful relative proportions of the active ingredients. More specifically, the dissolved content of vegetative polyphenolic material should constitute from about 5 percent to 40 percent of the weight of the solution. The sodium or potassium silicate should be present in an amount which provides about 1 percent to about 15 percent of $SiO_2$ based on the weight of the polyphenolic material. The paraformaldehyde should be present in an amount which provides a dissolved formaldehyde content of about 0.5 to about 5 percent based on the weight of the polyphenolic material, and the sulfamic acid should be sufficient to establish the pH within the range of about 0.5 about 6 for the amount of catalyst solution made from the multicomponent package.

Suitable polyphenolic materials are obtained by the extraction of Western hemlock, Douglas fir, White fir, Sitka spruce and Southern yellow pine (pinus echinata, taeda, caribaea, elliottii and rigida var. serotina), also quebracho, mimosa or other tannin containing trees or barks with aqueous solutions of sodium, ammonium and potassium hydroxides. Suitable extraction temperatures range from ambient to about 185° C. and extraction times from about 15 to 240 minutes depending upon the concentration of the alkali and other conditions used. Particularly useful polyphenolic materials can be prepared from barks by the methods of U.S. Pat. Nos. 2,782,241, 2,819,295, and 2,823,223. When the polyphenolic material is a vegetable tannin only catechin or condensed tannins such as those extracted from quebracho, mangrove, mimosa and wattle are usable. Gallo or hydrolyzable tannins such as those extracted from Chestnut, Myrobalans and DiviDivi are not as they cannot be gelled satisfactorily under limited-time grouting conditions. Utility of the tannins, just as with bark extracts, is based on a combination of formaldehyde reactivity, rapidity of gelation and solubility in alkaline solutions. Rate of gelation of the polyphenolic materials with formaldehyde depends upon their chemical constitution. The formaldehyde reactivity can be determined by the following test: In a 500 ml. beaker, an accurately weighed sample (about 20 g.) of the polyphenolic material and approximately 300 ml. of water are well mixed. The pH of the solution is adjusted to 9.5 by adding dropwise 5-10 percent sodium hydroxide or hydrochloric acid as required. The solution is then washed into a 500 ml. volumetric flask and 25 ml. of 37 percent formaldehyde is added. Water is then added to make 500 ml.

A blank determination is made by adding 25 ml. of 37 percent formaldehyde to a 500 ml. volumetric flask and diluting to volume with water. 5 ml. of this solution is added to 50 ml. of water and 10 ml. of 10 percent sodium sulfite solution. This solution is titrated to pH 9.5 with 0.1 N hydrochloric acid. The reaction is as follows:

$$CH_2O + Na_2SO_3 + H_2O \longrightarrow CH_2O \cdot NaHSO_3 + NaOH$$

From this titration is calculated the initial formaldehyde concentration.

After four hours a 5 ml. sample of the original solution is withdrawn, diluted with 50 ml. of water and adjusted to pH 7 with 0.1 N hydrochloric acid. To this solution is added 10 ml. of 10 percent sodium sulfite solution and it is then titrated with 0.1 N hydrochloric acid to pH 9.5. From this value is calculated the amount of formaldehyde remaining after 4 hours.

The formaldehyde which has condensed with the bark extract is determined by subtracting the formaldehyde found in the four hour sample from that found in the blank. This is expressed as grams of formaldehyde per 100 g. of dry, ash free bark material.

The above method of determining formaldehyde was described by Lemme, Chem Ztg. 27, 896 (1903).

The following table lists some typical formaldehyde reactivity of alkaline bark extracts:

| Species | Formaldehyde Reactivities | |
|---|---|---|
| | NaOH Extract | NH$_3$ Extract |
| Western Hemlock | 8.4 | 7.4 |
| Douglas Fir | 6.4 | 6.6 |
| Sitka Spruce | 6.0 | 7.4 |
| White Fir | 6.6 | 5.3 |
| Southern Yellow Pine | 6.0 | 7.5 |

The invention will be further illustrated by the following example which constitute preferred embodiments thereof.

EXAMPLE 1

Acidified sodium metasilicate catalyst solution was prepared by flowly pouring solution A into solution B with moderate agitation. Solution A was prepared by dissolving 20 pounds of sodium metasilicate granules and 20 pounds of paraformaldehyde powder, in that order, in 20 gallons of water. Solution B was prepared by dissolving 20 pounds of sulfamic acid crystals in 20 gallons of water. Sodium metasilicate concentration was 5 percent by weight, and the mixed catalyst solution had a pH around 2.

A 20 percent by weight solution, C, of vegetative polyphenolic material, comprising caustic extract of hemlock admixed with a commercial extract of quebracho wood, was prepared by dissolving 400 pounds of the solid admixed extracts in 180 gallons of water. The hemlock extract was obtained by autoclaving hogged Western Hemlock bark, sodium hydroxide and water in a ratio of 100 parts bark, 9 parts sodium hydroxide and sufficient water to make a total charge of 530 parts. The charge was heated rapidly to 100° C. with stirring and held at this temperature of 30 minutes and discharged onto a 40 by 60 mesh screen and the solid residue pressed. The extract solution was clarified, concentrated to about 30 percent total solids by evaporation and spray dried. A dark-colored, water soluble, alkaline polyphenolic material was obtained in a gross yield of 37 percent based on the weight of the original bark.

The prepared catalyst A-B and polyphenolic solution C were pumped separately through a mixing injection lance into a sand box of a size 4' × 4' × 6', containing ungraded construction sand. 1 to 2 gallons per minute pumping rate was employed for the polyphenolic solution, and the mixing ratio was controlled by metering pumps. A mixing nozzle of Y-shape was used to blend the polyphenolic C and catalyst solutions A-B just before entering the main portion of the grouting lance. A five-to-one volume ratio between polyphenolic and catalyst solutions was maintained throughout the operation. At this particular mixing ratio and about 20° C. ambient temperature the gel time was about 10 minutes. A sand block which had been grouted with this system showed good weather resistance, not only in nondrying exposure but also in drying and in freeze/thaw exposure.

Gel strength tests on laboratory grouts made of the same composition showed that this specific system produced a neat gel strength of 26 p.s.i. and impregnation gel strength of 1,100 p.s.i. for grouted 80 mesh sand 24 hours after mixing.

Two other laboratory tests showed that the gel prepared by this catalyst system had excellent water resistance. One test was made by submerging the neat gel in water and by inspecting the gel regularly for one week. Almost on change is in shape and quality of the gel was observed after a slight initial diffusion of polyphenolic material into water.

The other experiment was accomplished by preparing solution of gel polyphenolic 1 solely inch thick in the middle of a 1 foot wet sand layer (50 mesh) at the bottom of a 7 foot long water column in a glass pipe of 3 inch inside diameter. No measurable water seepage was noticed during 2 months after the gel preparation. The water column had shown a seepage rate of approximately 500 cu. ft. of water per sq. ft. of cross sectional area per day without the gel layer.

EXAMPLE 2

Acidified sodium silicate catalyst was prepared with sulfuric acid, instead of sulfamic acid, by example 1 solutions together, which had been prepared separately as follows: (1) 10 grams of sodium metasilicate were dissolved in 80 milliliters of water sulfuric acid A), and (2) 3 milliliters of concentrated sulfuric/acid were added to 80 milliliters of water (solution B). In mixing, solution A was poured into solution B with agitation to prevent possible gelation. Forty milliliters of 37 percent formaldehyde solution was added to the acidified sodium metasilicate solution. The pH of the final catalyst solution was 3. The solution had a clear, waterlike appearance, and its active ingredient concentration was approximately 5 percent by weight.

A 20 percent by weight solution of the alkaline polyphenolic material described in Example 1 was prepared by dissolving 270 grams of the material in one liter of water.

The same laboratory tests as used in example 1 showed that there was practically no difference from example 1 in gel time, gel strengths, and excellent water resistance of the gel, using the same mixing ratio between the polyphenolic and catalyst solutions as in example 1.

EXAMPLE 3

A 25 percent by weight solution of vegetative polyphenolic material comprising solely the hemlock bark extract described in example 1 was prepared by dissolving 362 grams of the polyphenolic material in one liter of water.

A 10 percent acidified sodium silicate solution was prepared by making use of the same sequence and the same amount of chemicals as in example 2 except 20 grams of sodium metasilicate and 6 milliliters of concentrated sulfuric acid were used.

A seven-to-one volume ratio of the polyphenolic to the catalyst solutions gave a gel time of about 20 minutes at room temperature. Neat gel strength was 10.4 p.s.i., and grouted sand gel strength was 900 p.s.i. 24 hours after the gel preparation. The same water submersion test as used in example 2 revealed that the gel prepared in this example had good, but somewhat lower, water resistance in comparison with the gels prepared in examples 1 and 2.

EXAMPLE 4

A 10 percent sodium silicate catalyst solution was prepared by dissolving 60 pounds of sodium metasilicate in 49.5 gallons of water, and then 12 gallons of 37 percent formaldehyde solution was added after the sodium silicate had completely dissolved. The solution was slightly turbid, and had a pH around 12.

A 25 percent by weight solution was prepared by dissolving 500 pounds of the vegetative polyphenolic material described in example 1 (with 6 percent moisture content) in 165 gallons of water.

A grouting field test was made by pumping the above two solutions with a volume ratio of 5:1 between polyphenolic and catalyst solutions into a sand box. The gel time was fairly short, 3 minutes, at ambient temperature of around 20° C. No difficulties were encountered during the grouting operation. This catalyst system developed almost no viscosity increase after mixing until the gel point was approached.

Laboratory tests on the gel of this composition showed 32 p.s.i. nest gel strength and 1,600 p.s.i. grouted gel strength with 80 mesh sand 24 hours after mixing.

THe same water submersion test as in example 1 showed that this alkaline system produced a neat gel which had low water resistance, as indicated by a considerable loss of the gel from its surface by redissolving during the one-week period. However, small sand blocks grouted by this catalyst system stood in the air several months under indoor laboratory conditions without showing any sign of crumbling, indicating exceptional stability under dry conditions.

EXAMPLE 5

Acidified sodium silicate catalyst solution was prepared in the same way as described in example 2.

A 25 percent polyphenolic solution was prepared by dissolving 356 grams of the polyphenolic material described in example 3 in one liter of water. The polyphenolic solution was mixed with an equal volume of anionic asphalt emulsion, Bitumuls DM-1, a product of Chevron Chemical Company, having a solid content of approximately 60 percent by weight.

The gel formed by mixing one volume of the acidified sodium silicate and five volumes of the polyphenolic-asphalt was highly water resistant and somewhat rubbery. The gel time was approximately 15 minutes at 75° C. The same water column test as in example 1 showed no water seepage for 4 weeks.

The polyphenolic-asphalt mixture is more resistant to weathering or exposure to elements than the polyphenolic solution gelled alone and is more economically placed in certain usages than the asphalt emulsion alone, such as, in roadbed treatment and canal linings.

EXAMPLE 6

A 10 percent sodium silicate catalyst solution was prepared by dissolving 20 grams of sodium metasilicate and 20 grams of paraformaldehyde in 160 milliliters of water.

A 20 percent polyphenolic solution was made by dissolving 264 grams of the polyphenolic material described in example 1 in one liter of water. Two volumes of the polyphenolic solution was mixed with one volume of cationic asphalt emulsion, Bitumuls SK-1, which was a product of Chevron Chemical Company, and of which the solid content was approximately 60 percent. Seven to one volume mixing ratio between the polyphenolic-asphalt mixture and the catalyst solution gave approximately 10 minutes gel time.

The gel formed was highly water resistant. The same tests as in example 1 for neat and grouted gel strengths showed that their strengths were 23 p.s.i. and 980 p.s.i. respectively.

The polyphenolic-asphalt mixture is more resistant to drying than the polyphenolic solution gelled alone and is more economic and properly placed than the asphalt emulsion alone. Also, the mixture is more resistant to freeze/thaw exposure and weathering cycles.

EXAMPLE 7

Acidified sodium silicate catalyst was prepared in the same way as in example 1.

A slurry of polyphenolic-Bentonite mixture was prepared by dissolving 46 pounds of the polyphenolic material described in example 1 in 30 gallons of water, resulting in 15 percent polyphenolic concentration by weight. Four gallons of Bentonite clay by bulk volume was added to the polyphenolic solution.

The slurry and the catalyst were pumped together into a test plot of sandy, water-saturated soil. The gel time was approximately 25 minutes at a pumping ratio of eight to one between the slurry and the catalyst solution. The grouted gel layer in the ground showed a complete blocking of water seepage.

The polyphenolic-clay mixture sets up and stops water faster than clay alone and remains more permanently in place. It is also more economic and efficient in placement than the polyphenolic material gelled alone.

EXAMPLE 8

A 10 percent sodium silicate catalyst and 20 percent polyphenolic solution were prepared in the same way as in example 6. One part of Portland cement was added to four parts of the 20 percent polyphenolic solution and mixed completely.

The mixture of polyphenolic and cement was combined with the 10 percent sodium silicate catalyst solution in a 5 to 1 mixing ratio. The neat gel obtained showed improved neat gel strength, 33 p.s.i. at 24 hours after mixing. The resulting gel was more water resistant than in the case of the alkaline silicate catalyst.

The polyphenolic-cement mixture gives a faster set than the cement alone and a more permanent high strength than the polyphenolic material gelled alone.

We claim:

1. A composition for producing a chemically grouted structure which consists essentially of an aqueous base solution of (a) vegetative polyphenolic material selected from the group consisting of catechin and condensed-type tannins and alkaline extracts of a coniferous tree bark and an aqueous catalyst solution of (b) a water soluble alkali metal silicate, said polyphenolic material being present in an amount from about 5 percent to about 40 percent based on the weight of said base solution and said water soluble alkali metal silicate being present in an amount to provide from about 1 percent to about 15 percent of $SiO_2$ in the silicate compound based on the weight of said polyphenolic material.

2. A composition according to claim 1 wherein said alkali metal silicate has a weight ratio of $SiO_2$ to alkali metal oxide of from about 1.0 to about 3.8.

3. A composition according to claim 1 which further contains from about 0.5 percent to about 5.0 percent of formaldehyde based on the weight of said polyphenolic material.

4. A composition according to claim 3 in which said alkali metal silicate is sodium or potassium silicate.

5. A composition according to claim 4 which contains sulfamic acid in an amount sufficient to adjust the pH in the catalyst solution to from about 0.5 to 6.0.

6. A composition according to claim 4 in which said pH is adjusted from about 3.0 to about 5.0.

7. A composition according to claim 4 which further contains an auxiliary material dispersed therein, said material being selected from the group consisting of aqueous asphalt emulsion, clay, hydraulic cement, asbestos and mixtures thereof.

8. A composition for producing a grouted structure which consists essentially of an aqueous solution of (a) vegetative polyphenolic material selected from the group consisting of catechin and condensed-type tannins and alkaline extracts of a coniferous tree bark, in an amount from about 5 percent to about 40 percent based on the weight of the solution, (b) sodium metasilicate in an amount sufficient to provide from about 1 percent to about 15 percent of $SiO_2$ based on the weight of said polyphenolic material, (c) formaldehyde in an amount from about 0.5 percent to about 5.0 percent based on the weight of said polyphenolic material, and (d) a strong acid in an amount sufficient to establish to pH of the solution within the range from about 0.5 to 6.0.

* * * * *